Dec. 12, 1944.   W. J. JOYCE   2,365,085
PROCESS OF BREAKING LAMINATED ARTICLES
Filed May 10, 1941   3 Sheets-Sheet 1

INVENTOR.
WILLIAM J. JOYCE
BY
Louis L. Gagnon
ATTORNEY.

Dec. 12, 1944.     W. J. JOYCE     2,365,085
PROCESS OF BREAKING LAMINATED ARTICLES
Filed May 10, 1941     3 Sheets-Sheet 2

INVENTOR
WILLIAM J. JOYCE
BY Louis L. Gagnon
ATTORNEY

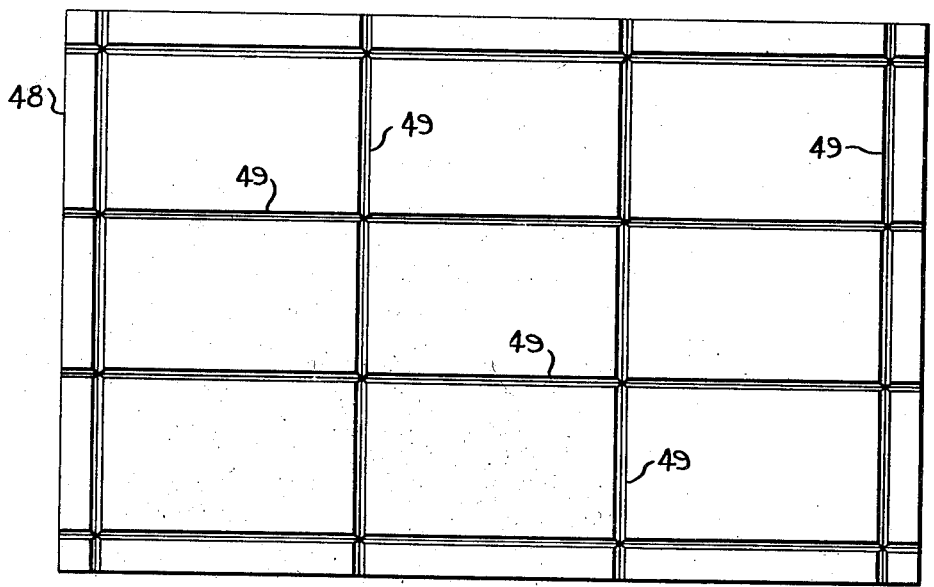
Fig. 10
Fig. 11
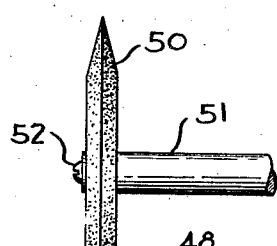
Fig. 12
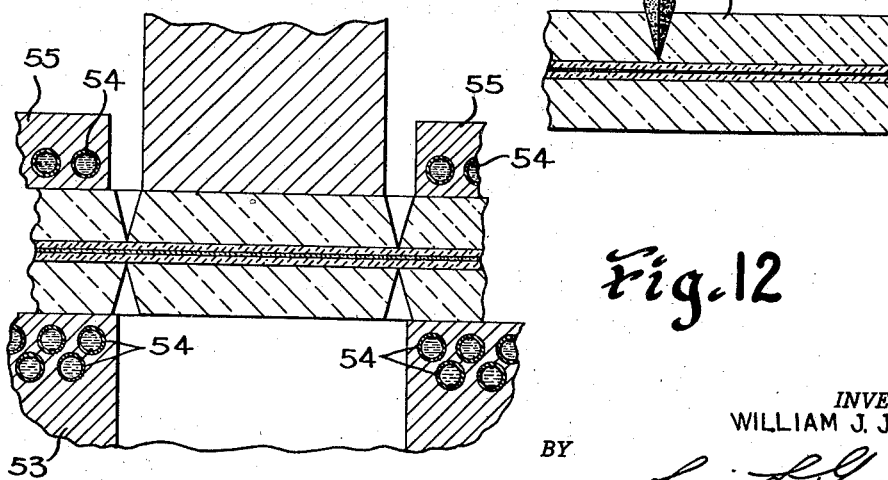

Patented Dec. 12, 1944

2,365,085

UNITED STATES PATENT OFFICE 2,365,085

PROCESS OF BREAKING LAMINATED ARTICLES

William J. Joyce, Southbridge, Mass., assignor to American Optical Company, Southbridge, Mass., a voluntary association of Massachusetts Application May 10, 1941, Serial No. 392,927

2 Claims. (Cl. 49—77)

This invention pertains to an article of laminated material and a method of producing same by providing more positive definition on the edge of the laminated article by restricting the intermediate layer about the peripheral edge of the article from being disrupted by disturbing the bond between the individual plates of lamina and the intermediate layer. The disruption of the bond about the peripheral edge, which is frequently referred to as fringing, presents many problems which frequently required extra processing and additional steps in presenting the article in its ultimate form.

Heretofore, the ordinary method of breaking laminated glass was to cut the glass with the conventional cutter such as a diamond or other hard cutting edge and then bending the glass so that the weakest portion of the glass would be along the cut edge or outlined contour. The bending operation would cause the weaker portion to give way and the glass would break along the contour edge or scoring outline. The intermediate layer would then have to be cut with a sharp instrument. No provision has been made heretofore for employing a special operation or process concerning the break of the center lamination or intermediate layer. Consequently, depending on the particular characteristics or properties of the intermediate layer, the lack of special treatment or consideration thereof resulted in fringing of the intermediate layer while the outer layers of glass usually had the commercially acceptable outer contour edge due to the scoring definition resulting from the cutting tool operation. The bonds between the intermediate layer and the glass components were usually weakened.

The fringing of the intermediate layer due to the breaking operation becomes a serious problem when working with ophthalmic optics or glass used generally for optical purposes, particularly when the usable area of the glass is not large and the fringing due to the breaking operation causes image distortion.

Safety lenses for eye protection may employ a non-shatterable glass having an intermediate layer of bonding material for retaining the opposing glass lamina in a predetermined position. The laminated lens ordinarily consists of two substantially preshaped lenses which are placed together after receiving the intermediate layer of a material such as polyvinyl acetal. The bonding operation fixes the components in a definite position so that the resultant lens is a laminated "safety" glass. This method of preshaping the glass components is existent in commercial practice for practically all laminated glass whether it is in the ophthalmic optical art or for other purposes such as windshields, windows, various type lenses in the general field of optics and for other purposes. The previous methods all required a blanking operation for the glass components prior to bonding.

Heretofore, the lack of a suitable method of breaking the glass required either that laminated glass be bought having the desired dimensions, or else the unused portion of the glass was usually destroyed by the "crumbing" method which causes destruction of the bonding about the periphery, frequently necessitating grinding of the peripheral edge, depending on many factors.

In the field of ophthalmic optics lenses for safety goggles ordinarily require factory cutting and the average man in the field has no means for providing lenses for safety goggles unless the lenses are precut to the desired shape and dimensions.

The present method will permit safety lenses to be provided in blank form the same as regular single layer lenses. The resultant cut safety lens will have no destruction of the bond around the peripheral edge of the intermediate layer thereby eliminating fringing which would ordinarily cause distorted vision. The present invention will also permit the use of large plates of safety glass to be carried in stock by jobbers and be used as needed without material destruction of the remainder of the laminated sheet.

The laminated glass is cut on the surface, or on two surfaces as the case may require, in the usual manner such as by a diamond cutter. The cuts are usually opposite each other when the two surface cut is used. The laminated glass is then chilled or frozen by subjecting same to a cooling operation in aeriform fluid, or liquid refrigerant depending on the characteristics of the material to be cut. The temperature of the cooling chamber is such that the laminated glass to be cooled is reduced in temperature so that the intermediate layer approaches a brittleness, or definitely becomes brittle due to the reduction in temperature of the intermediate layer. After the laminated glass is removed from the chamber, the bending operation follows so that the laminated glass breaks causing a breaking of the intermediate layer due to its brittleness, in contradistinction to the strain and tear method.

In the event that it is desirous to make rectangular or square shaped plates, such as is used in cover plates for welding helmets, windshields, or windows, which are such that they provide a straight line edge, or a curved edge of an arc large enough to permit use of a grinding wheel, a nearly through or through cut in the outer glass layers may be used advantageously In this case there is no necessity for the "edging" operation now commercially used by the current conventional method of breaking laminated glass.

However, when it is desirable and possible to obtain a uniform contact in the assembled device, throughout the adjacent peripheral edge of the laminated material, the V-bottom cut may be used, thus eliminating the necessity of the edging operation which has heretofore been used subsequent to the cutting operation on this class of work.

It should be obvious to one skilled in the art that such edging is not required in every laminated piece of glass that is cut, but where edging was formerly used it may now be eliminated in certain classes of work, by combining the cutting and the equivalent of edging by a single operation of the bottom cut or bottom grind.

Up to this point in the specification, the reference has generally been to the end of obtaining single articles, that is the making of one article at a time. This has been done for simplicity to define the article and the method of producing same. In production, it may be necessary to make a plurality of the articles by a simplified method, such as cutting many of the articles in a single operation. Further, the lot of articles, after shaping and cutting, may be obtained in final form by a single operation, such as by punching. The application so far has indicated that the article is subjected to a refrigerant, and in a separate step it has been broken from the remaining strip or plate of laminated material. For production, the laminated plate stock may be placed in a refrigerated punch press or punching machine after it has been scored or cut, and without removing same from the refrigerated punch press the ultimate article may be punched from the strip or laminated plate stock while still in the refrigerated punch press. Clamping means may be provided to hold the stock in place on the punch press, and cutting means may also be used for scoring or bottom cutting the individual lamina while it remains in the punch press.

It is an object of this invention to provide an improvement in the method of breaking laminated material by subjecting the material to be broken to refrigeration prior to the breaking operation.

It is a further object of the invention to reduce the temperature of the laminated material to be broken by subjecting said material to an aeriform or liquid cooling medium.

A further object of the invention is to provide a process for cutting laminated glass by scoring the surfaces of the glass with a cutting tool and subsequently subjecting the scored glass to suitably low temperatures to permit the plastic material to become sufficiently hard so that it will break when the glass components of the laminated material breaks.

A further object of the invention is to score the surfaces of a laminated material and subsequently subject the scored area of the laminated material to the cooling action of a refrigerant so that the breaking process will cause the break to run through the lamina so that the three components of the laminated piece are broken in unison substantially as though they were a single thickness of glass.

A further object of the invention is to expose the scored area of a laminated article to a temperature sufficiently low so that the intermediate layer will not draw out from between the internal glass surfaces when the bending and breaking process takes place.

It is a further object of the invention to provide a method of breaking laminated glass by initially scoring said laminated glass on both sides thereof and centrally and/or axially aligning same to provide substantially an oppositely scored portion having the second scoring being substantially opposite the first scoring through the scoring outline.

It is a further object of the invention to provide a plurality of laminated articles and method of producing same by scoring a multiplicity of the articles by a single operation, said scoring being in the ultimate or substantially ultimate form and size for use, depending upon whether or not the scoring per se is of a general surface type or whether the bottom or substantially bottom cut is used.

A further object of the invention is to provide a punch press device for punching out a multiplicity of articles by a single operation.

A further object of the invention is to provide means for cooling or refrigerating the punch press so that the articles may be punched out by a single operation without removing the laminated stock from the punch press.

A further object of the invention is to provide clamping means for positioning and holding the laminated stock in the punch press during the refrigerating and punching operation.

Further and other objects may be and may become apparent to one skilled in the art without departing from the spirit of the invention as set forth in the subjoined claims.

In the drawings:

Fig. 10 is a plan view of laminated plate stock with the cut outlined by means for producing a cut substantially through the outer plates.

Fig. 11 is a punch press having refrigerated die plate and cover plate members with a portion of laminated stock inserted therein prior to the actual punching operation.

Fig. 12 shows a grinding wheel in relation to a completed cut substantially through the outer plates in a piece of laminated material.

Figure 1:
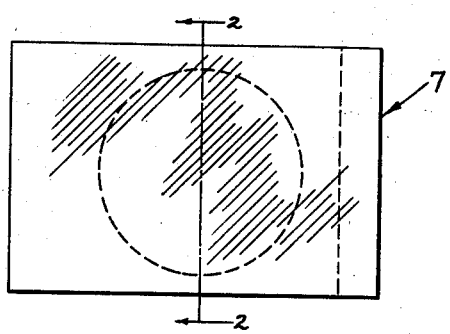
Fig. 1 is a plan view of a laminated material to be broken as outlined.

Referring to the drawings and more particularly to Fig. 1, a laminated glass plate 7 having a dotted circle and a dotted straight line thereon represents scoring lines, which scoring is ordinarily done with the conventional type glass cutter in a well-known manner. The circle outline may be taken as representative of the shape of a round lens such as used in a safety goggle.

Figure 2:
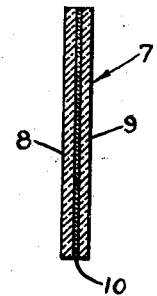
Fig. 2 is a section of the laminated material taken along lines 2—2 of Fig. 1.
Figure 3:
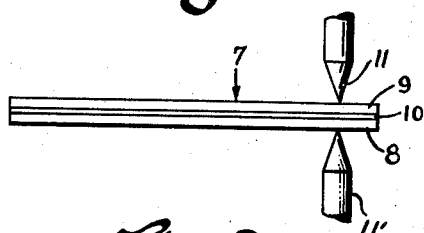
Fig. 3 shows a cutting tool in position for scoring the surface of the article such as displayed in Fig. 1.
Figure 4:
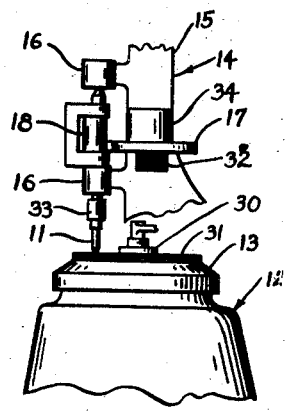
Fig. 4 is a means of scoring the surface of a definitely shaped object, such as a lens.

Fig. 2 shows the laminated plate having outer glass sheets 8 and 9, with an intermediate layer 10, which intermediate layer is the bonding material of any well-known type, a concrete example being polyvinyl acetal. The cross sectional representation in Fig. 3 shows the laminated plate 7 with its outer layers 8 and 9 respectively each made of glass and having an intermediate layer 10 as the bonding material. A cutting tool 11 is shown in Fig. 3 engaging the outer surface of the lamina 9, to score the upper surface of lamina 9 substantially along the straight dotted line such as shown in Fig. 1. Below the plate, a cutting tool 11', similar to cutting tool 11, is in position to cut or score the opposing plate 8 substantially opposite the score caused by the cutting tool 11. A cutting device 12 is shown in Fig. 4 having a work support turntable 13 carrying a laminated safety lens 31 which may be of material similar to the laminated plate stock 7. A work holder 30 engages the upper surface of the lens and holds it in fixed position with the turntable 13 so that the turntable and lens 31, pivotally mounted on the base support 12 may be rotated. An upper head 14 has an upright portion 15 with journals 16 carried thereon. A tool holder 33 is supported by the journals 16 and has a cam follower 18 on the upper portion thereof and a tool 11 located on the lower portion thereof. The tool may have a hard cutting surface such as a diamond on the extreme lower tip for engaging the surface of the safety lens 31. A cam 17 is secured to a hub 34 by a securing member or knurled knob 32. In operation the cam 17 is stationary while the worktable 13 and lens 31 rotate. The cam follower and tool 33 oscillate to follow the contour of the cam pattern 17 in much the same manner as is disclosed in the patent issued to A. E. Maynard, Patent Number 1,683,295. The disclosure in Fig. 3 is simply representative of cutting both sides of the laminated stock and no new method is intended therein.

Heretofore, it has only been necessary to score the glass, such as a lens, on one side thereof. With laminated glass such as in a safety lens, it now becomes necessary to score said laminated glass or lens on both sides thereof. For aligning a lens and centering same so that the lens will properly be centered with the cam pattern or former, a marking such as an ink marking is placed on the lens to indicate usually the major axis, and the optical center of the lens. With the safety goggle it is necessary to score both sides thereof, and in this case the lens is centered over the point of the center aligning pin to obtain the optical center in alignment with the center of the cam pattern or former. The axis of the lens has an ink marking aligned with a corresponding marking usually on a pad below the lens which is supported on the rotating table 13. To turn over the lens it is only necessary to revolve the position of the cam pattern or former so that it is horizontally displaced 180° except in the case where a round or symmetrical lens is to be cut. The center lens aligning pin and rubber mat marking for aligning the lens centrally and axially is well-known in the art. This present invention contemplates utilization of this system with the addition of revolving the cam pattern or former so that the method may be completed.

A cooling chamber 19 has a closure or door 20 which may be removed for the purpose of inserting the scored laminated plate 7 therewithin. The cooling chamber 19 may be of any conventional type but is presented as having a plurality of pipes 21 disposed throughout, which cooling pipes having liquid refrigerant therein to reduce the temperature of the aeriform fluid which may be air or gas, depending on the particular results desired.

Figure 6:
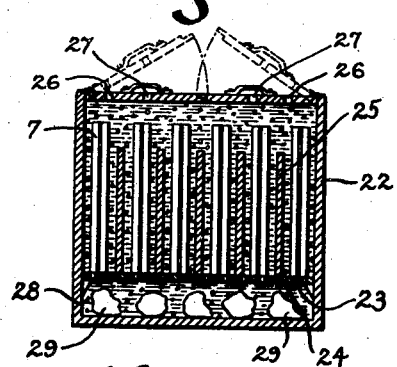
Fig. 6 is a liquid cooling chamber for immersing the laminated article in a liquid refrigerant.

A liquid cooling chamber is shown in Fig. 6 having a housing 22 with a grill or work support 23 spaced from the bottom thereof with holes or vents 24 therein to permit liquid and gas to flow therethrough. A plurality of uprights 25 are connected to the grill or sidewalls and are merely used to provide a spacing means for the scored laminated plates 7. A pair of hinged closures 26 are shown closed and have vents 27 therein to permit gas to escape. The hinged closures 26 are shown dotted in a partially open condition indicating that the closures may be swung out of the way when access is desired to the liquid cooling chamber.

The liquid 28 in the liquid cooling chamber may be ethyl alcohol, denatured alcohol, acetate, kerosene, or other liquid media. Solid carbon dioxide 29 is shown as being placed below the removable grill 23.

Figure 7:
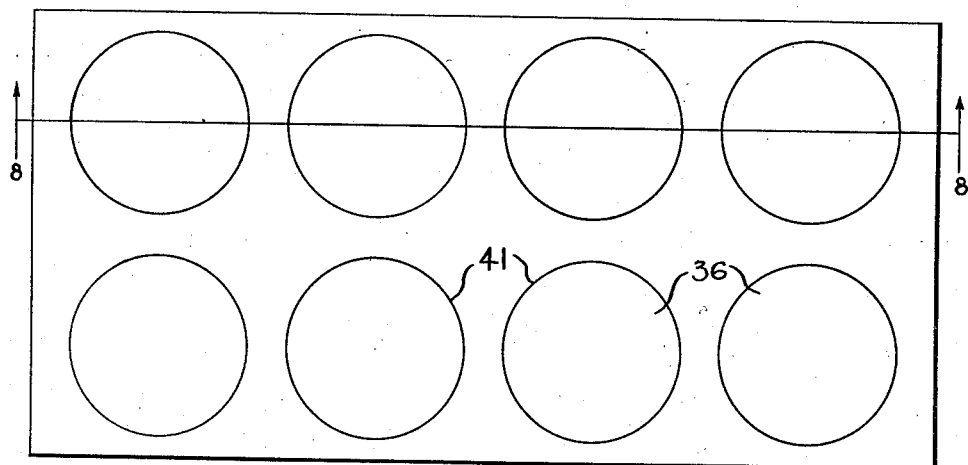
Fig. 7 is a plan view of a laminated plate with individually cut outlines of laminated articles.

Fig. 7 shows a laminated plate stock 35 which has a multiplicity of scored articles 36. The plate stock is scored in this form for the purpose of making the article, in what is referred to as "production" manufacture. The scoring of the articles 36 for certain types of work, may be in much the same manner as already described referring to Figs. 1 and 3.

A punch press 37 shows a punch or die plate 38 having openings 39 therein, with a multiplicity of punches 40 located above the openings 39 in the die plate. The laminated stock 35 is shown with its scorings 41 so aligned that the punch 40 in each case, will force the article 36 through the opening 39, said opening 39 being larger than the article 36.

Figure 8:
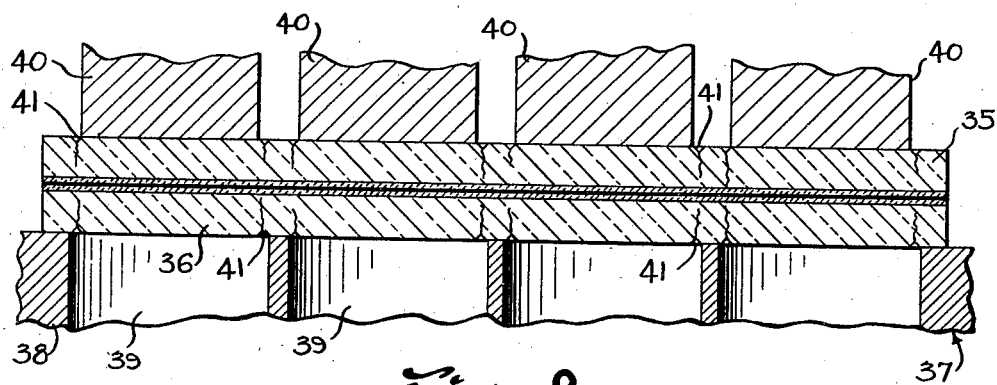
Fig. 8 shows a punch press for punching out the individually prescored articles while a laminated plate is under the effect of refrigeration.
Figure 9:
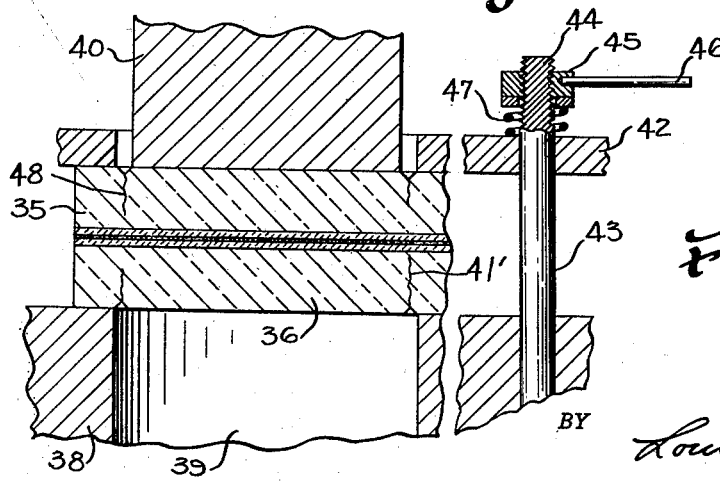
Fig. 9 is a punch press having the diameter of the die plate materially greater than the diameter of the punch, in conjunction with the feature of resiliently locking the clamp plate in relation to the die plate.

An enlarged section of the punch press shown in Fig. 8 is presented in Fig. 9 wherein like character references represent like parts in other views of the present disclosure. In the enlarged view in Fig. 9 a clamping plate 42 is shown located above the laminated plate stock 35. The clamping member comprises a stud 43 which is held in any convenient manner positioned in the die plate 38. A threaded portion 44 on the upper end of the stud 43 extends through an opening in the clamping plate 42 while a nut 45 is threadedly connected to the portion 44 of the stud 43. A small lever 46 or other suitable means is shown secured to the nut 45 for the purpose of giving leverage, while the spring 47 provides a resilient compression means for holding the clamping plate 42 firmly against the laminated stock 35.

A sheet of laminated plate stock 48 is shown in Fig. 10 having cuts 49 which extend substantially through the outer plates and which provide dimensions and contour for preshaped articles of laminated plate stock such as rectangular shaped safety glass which may be used in the cover plates of welding helmets, windows, and the like.

Fig. 11 is an enlarged view of a laminated stock 48 shown in Fig. 10, with a cutting tool such as a grinding wheel 50 is securely fastened on a revolvable shaft 51, which cutting wheel is affixed to said shaft in any convenient method such as by a screw 52. The showing in Fig. 11 is merely representative of a cutting tool of the grinding wheel type, but any convenient method can be used for providing the bottom cut or substantially bottom cut, for producing the desired results. The enlarged view in Fig. 12 shows a refrigerated die plate 53 and a clamping plate 55 having refrigerating tubes or pipes 54 located therein.

The laminated plate stock, if scored with a tool such as a diamond cutter, will have a crack below the surface of the depth of the actual cutting, said crack 41' being shown by a ragged line in Fig. 9. The depth of the crack is variable, frequently depending on the pressure of the cutting tool, and the crack will have depths varying to the laminated layer. Because of this condition, it is possible to punch out the individual articles, since the refrigerated laminated plate stock has now become brittle due to the lowering of temperature of the intermediate layer. Where the bottom cut is used, the punching operation simply involves the breaking through of the intermediate layer without any material disturbance of the bond between the individual lamina components.

The material of which the punch, clamping plate, and die plate, are made, has not specifically been stated heretofore, but regards the material of the punches 40, the clamping plate 42 and the die plate 38, these particular members may be made of various forms of rubber, plastic, or fibrous material. The particular hardness of the material used would be somewhat dependent upon the size and thickness of the laminated article. While the parts may be made of metal if desirable, it is pointed out that these parts may be surfaced with a suitable material to prevent scratching or marring of the article to be manufactured.

While specific means have been shown for obtaining the scoring and/or cutting of the laminated stock, and specific means have also been shown for clamping and refrigerating the die press, it is to be understood that any conventional means or combination of conventional means may be used individually or in combination with the present disclosure to obtain the desiratum in attaining the results accomplishable by the present disclosure.

Actual use of the present process has been carried out using various refrigerants or liquid cooling means such as ethyl alcohol and kerosene which is chilled by solid carbon dioxide and reduced to a temperature sufficient to bring about the results desired. Temperatures ranging approximately between −50° C. and −80° C. were obtained and the results in breaking the laminated glass after the scoring or cutting operation indicated that the brittleness of the intermediate layer such as polyvinyl acetal, was sufficient to give an adequate break through the intermediate layer without any appreciable destruction of the bond between the glass lamina about the edges thereof. Fraying of the intermediate layer was eliminated. When the work was done on safety glass such as used for goggles the break resulted in no distorted vision when the glass was used for optical purposes. Certain specific cooling or chilling means have been set forth as being suitable refrigerants, and certain intermediate layer material has been likewise set forth as being suitable, but it is to be understood that these expressions are in no way limitations and are only by way of example to indicate at least one actual example that has been found suitable and successful for at least one particular problem presented. Conventional methods of cooling may be used where practicable.

Figure 5:
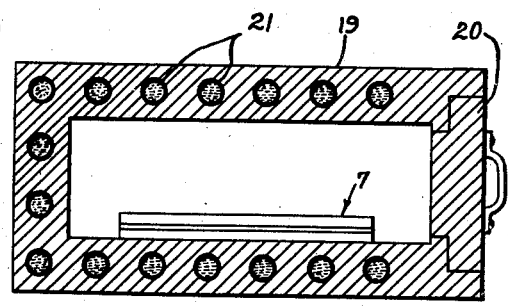
Fig. 5 is an aeriform cooling chamber using a liquid cooling medium for cooling the interior of the chamber.

A specific instance of employing the cooling medium has been presented in the present application but the art of refrigeration is sufficiently developed so that one skilled in the art would be able to provide suitable refrigerating means such as disclosed in Fig. 5, and as also disclosed in Fig. 12.

The word "breaking" is used to designate the complete severance of a laminated piece of stock so that one piece of laminated stock may be reduced to two or more pieces of laminated parts. "Cutting," more specifically refers to the scoring operation, while breaking more specifically refers to the bending action or other action which may be found suitable to disrupt the intermediate layer between the external lamina components of a laminated sheet or plate. While scoring has been referred to as being a cutting action by a cutting tool, an actual cut may be made substantially through the glass to the intermediate layer. This may be produced by any suitable tool which may be a grinding wheel or other means. When the method of substantially cutting through the outer plates of the laminated stock is used, the breaking operation causes the intermediate layer to be broken cleanly without fringing or disruption of the bond about the peripheral edge of the laminated stock and without requiring any further edging of the article since the glass lamina is already definitely severed.

In commercial practice, the method and means employed may involve changes from the specific disclosure set forth herein and minor changes may readily suggest themselves. The right to make certain minor departures from the specifications and drawings is retained and equivalent parts may be used within the spirit of the invention as defined by the subjoined claims.

Having described my invention, I claim:

1. A method of simultaneously making a plurality of articles of laminated plate stock having an intermediate layer of bonding material between the lamina components of the laminated plate stock comprising the step of cutting the surfaces of the laminated plate stock into a multiplicity of individually scored outlines, a further step of subjecting the individually scored outlines to the action of a cooling medium to lower the temperature of the intermediate layer, and a still further step of simultaneously pressing the individually scored articles out of said plate stock while said plate stock is held in a substantially fixed position.

2. The method of simultaneously making a plurality of substantially similarly shaped articles out of a single piece of laminated plate stock having an intermediate layer, comprising the step of cutting outlines on opposing surfaces of the plate stock so that a multiplicity of cut closed areas results from the cutting to form a multiplicity of preshaped article outlines, subjecting the plate stock to a refrigerant to lower the temperature of the intermediate layer of the plate stock, and simultaneously forcing the pre-outlined articles from the plate stock while said plate stock is held in a substantially fixed position.

WILLIAM J. JOYCE.